US008566075B1

(12) United States Patent
Bruner

(10) Patent No.: US 8,566,075 B1
(45) Date of Patent: Oct. 22, 2013

(54) APPARATUSES, METHODS AND SYSTEMS FOR A TEXT-TO-SIGN LANGUAGE TRANSLATION PLATFORM

(75) Inventor: Steve Bruner, Brooklyn, NY (US)

(73) Assignee: PPR Direct, Brooklyn, NY (US)

( * ) Notice: Subject to any disclaimer, the term of this patent is extended or adjusted under 35 U.S.C. 154(b) by 891 days.

(21) Appl. No.: 11/756,298

(22) Filed: May 31, 2007

(51) Int. Cl.
*G06F 17/28* (2006.01)

(52) U.S. Cl.
USPC .................................. 704/2; 704/3; 704/270

(58) Field of Classification Search
USPC ........... 704/2, 3, 270, 271, 277; 715/706, 865
See application file for complete search history.

(56) References Cited

U.S. PATENT DOCUMENTS

| | | | | |
|---|---|---|---|---|
| 5,481,454 A | * | 1/1996 | Inoue et al. | 704/3 |
| 5,544,050 A | * | 8/1996 | Abe et al. | 715/246 |
| 5,659,764 A | * | 8/1997 | Sakiyama et al. | 704/3 |
| 5,890,120 A | * | 3/1999 | Haskell et al. | 704/271 |
| 5,953,693 A | * | 9/1999 | Sakiyama et al. | 704/3 |
| 5,990,878 A | * | 11/1999 | Ikeda et al. | 715/236 |
| 6,116,907 A | * | 9/2000 | Baker et al. | 434/156 |
| 6,181,778 B1 | * | 1/2001 | Ohki et al. | 379/52 |
| 6,250,928 B1 | * | 6/2001 | Poggio et al. | 434/185 |
| 6,549,887 B1 | * | 4/2003 | Ando et al. | 704/271 |
| 7,277,858 B1 | * | 10/2007 | Weaver et al. | 704/271 |
| 2002/0032702 A1 | * | 3/2002 | Horii | 707/515 |
| 2002/0140718 A1 | * | 10/2002 | Yan et al. | 345/706 |
| 2003/0027489 A1 | * | 2/2003 | Kay | 446/397 |
| 2004/0012643 A1 | * | 1/2004 | August et al. | 345/865 |
| 2004/0034522 A1 | * | 2/2004 | Liebermann et al. | 704/2 |
| 2004/0143673 A1 | * | 7/2004 | Kristjansson | 709/231 |
| 2005/0033578 A1 | * | 2/2005 | Zuckerman | 704/271 |
| 2006/0134585 A1 | * | 6/2006 | Adamo-Villani et al. | 434/112 |

OTHER PUBLICATIONS

Veale et al. "The Challenges of Cross-Modal Translation: English-to-Sign-Language Translation in the Zardoz System", Machine Translation 13: 81-106, Kluwer Academic Publishers, 1998.*
Darren Murph, "Detection Algorithms to Enable Sign Language On-The-Go", Feb. 14, 2007, Internet article, www.engadget.com.
"Sign Language Animations", Internet article, pp. 1-5, www.signingbooks.org, Nov. 2007.
"RNID: For Deaf and Hard of Hearing People", pp. 1-2, Internet article, www.rnid.org.uk, Nov. 2007.
"RNID: For Deaf and Hard of Hearing People", pp. 1-4, Internet article, www.rnid.org.uk, Nov. 2007.

* cited by examiner

*Primary Examiner* — Jialong He
(74) *Attorney, Agent, or Firm* — Fitch Even Tabin & Flannery LLP

(57) ABSTRACT

The present disclosure details apparatuses, methods, and systems for a text-to-sign language translation platform ("translation platform"). The translation platform enables efficient, real-time processing of written speech elements, such as may be supplied by a Closed Captioning feed, and conversion to sign language video clips that may be output to a video display, such as via an embedded "picture-in-picture" window. The translation platform is configurable to process homographs, synonyms, grammatical context, multiple speakers, tone of voice, and/or the like.

14 Claims, 8 Drawing Sheets

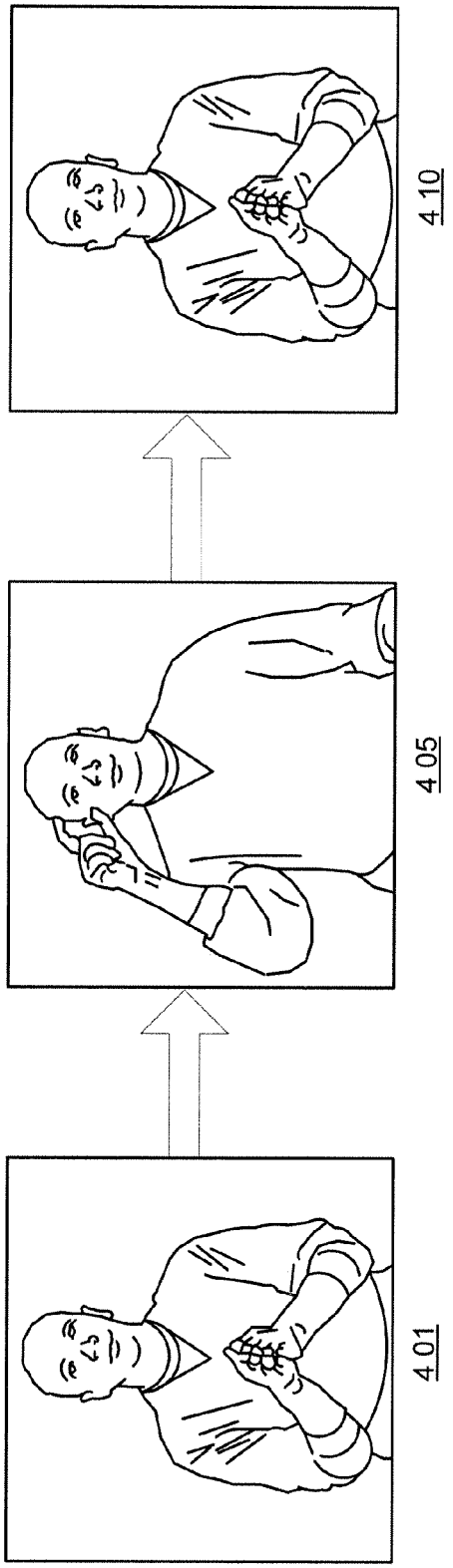

APPARATUSES, METHODS AND SYSTEMS FOR A TEXT-TO-SIGN LANGUAGE TRANSLATION PLATFORM

FIELD

The present invention is directed generally to apparatuses, methods, and systems of accessibility, and more particularly, to apparatuses, methods and systems for converting written speech elements to sign language ("SL").

BACKGROUND

Closed Captioning feeds accompanying video and audio broadcasts help hearing impaired individuals understand and enjoy content that might otherwise be inaccessible to them. Currently, most television broadcasts, both live and pre-recorded, are transmitted with accompanying Closed Captioning or Subtitles. Advances in data storage and transmission technology have also come about that allow quick access to properly organized data of a variety of different file formats.

SUMMARY

Though Closed Captioning is beneficial for many individuals, there are those for whom an alternative form of communication may be preferable or more beneficial. For example, people who are born deaf or who lose their hearing within the first three years of life often have difficulty with spoken languages and may even come to view those languages as secondary to sign language, which can be perceived as a more natural, primary language choice. These people may have trouble reading captions and, consequently, would benefit from alternative forms of accessibility translations.

This disclosure details the implementation of apparatuses, methods, and systems for a text-to-sign language Translation Platform. The Translation Platform processes various types of textual elements as inputs to yield sequences of sign language video clips corresponding to the information content of those inputs. In one embodiment, the Translation Platform allows for rapid conversion of Closed Captioning text feeds to a sign language video stream that may be displayed, for example, in a picture-in-picture box on a television or other display medium alongside the corresponding broadcast, thereby providing hearing impaired individuals with an alternative and possibly more effective accessibility option.

In one embodiment, a method is disclosed for translating speech elements derived from a Closed Captioning feed to sign language video clips, comprising receiving an input speech element, querying a video database for the speech element, selecting from the video database at least one target video clip based on the speech element wherein the at least one target video clip exhibits continuity promoting images in the opening and closing frames, and outputting the at least one target video clip to a display device.

In another embodiment, a method is disclosed for translating speech elements derived from a Closed Captioning feed to sign language video clips, comprising receiving an input speech element, selecting from a video database at least one target video clip directly corresponding to the speech element for speech elements that exist in the video database, querying a thesaurus for the speech element and selecting from a video database at least one target video clip directly corresponding to at least one synonym of the speech element for speech elements that do not exist in the video database but do exist in the thesaurus database, querying a thesaurus database for the speech element and selecting from video database at least one target video clip directly corresponding to at least one constituent letter of the speech element for speech elements that do not exist in either the video database or the thesaurus database, and outputting the video clip for display.

BRIEF DESCRIPTION OF THE DRAWINGS

The accompanying appendices and/or drawings illustrate various non-limiting, example, inventive aspects of systems, methods and apparatuses for facilitating a translation platform in accordance with the present disclosure:

FIG. 4 shows a technique to reduce discontinuity between video clips in one embodiment;

DETAILED DESCRIPTION

Text-to-Sign Language Translation Platform

The present disclosure includes a discussion of apparatuses, methods, and systems for a text-to-sign language translation platform (hereafter "translation platform"). The translation platform may be configured to receive and process data pertaining to spoken or written languages, as well as produce corresponding sign-language translations manifested in video clips. In one embodiment, the translation platform employs or interacts with three basic actors: (i) a "broadcaster" capable of supplying content data input to the translation platform; (ii) a "display" capable of receiving and displaying video output from the translation platform; and (iii) a "display control processor" capable of receiving and processing broadcaster input and supplying video output to the display.

While the translation platform may be described herein primarily in the context of converting Closed Captioning data-streams to sign language video clips in a picture-in-picture style display on a television screen, it is to be understood that this is merely for illustrative purposes, and that the translation platform may in fact be configured for a wide variety of different applications and implementations. For example, the translation platform may be configured as a set-top box that receives an input from a cable box. In another implementation, the translation platform may be incorporated into the cable box. Alternately, in yet another implementation, it may be incorporated into the video display device. Furthermore, the generic term "sign language" should be understood to encompass all forms of sign language, including but not limited to American Sign Language (ASL), British Sign Language (BSL), French Sign Language (FSL), Signed English, Pidgin Signed English, Manually Coded English, and/or the like.

Structural Overview

Figure 1:
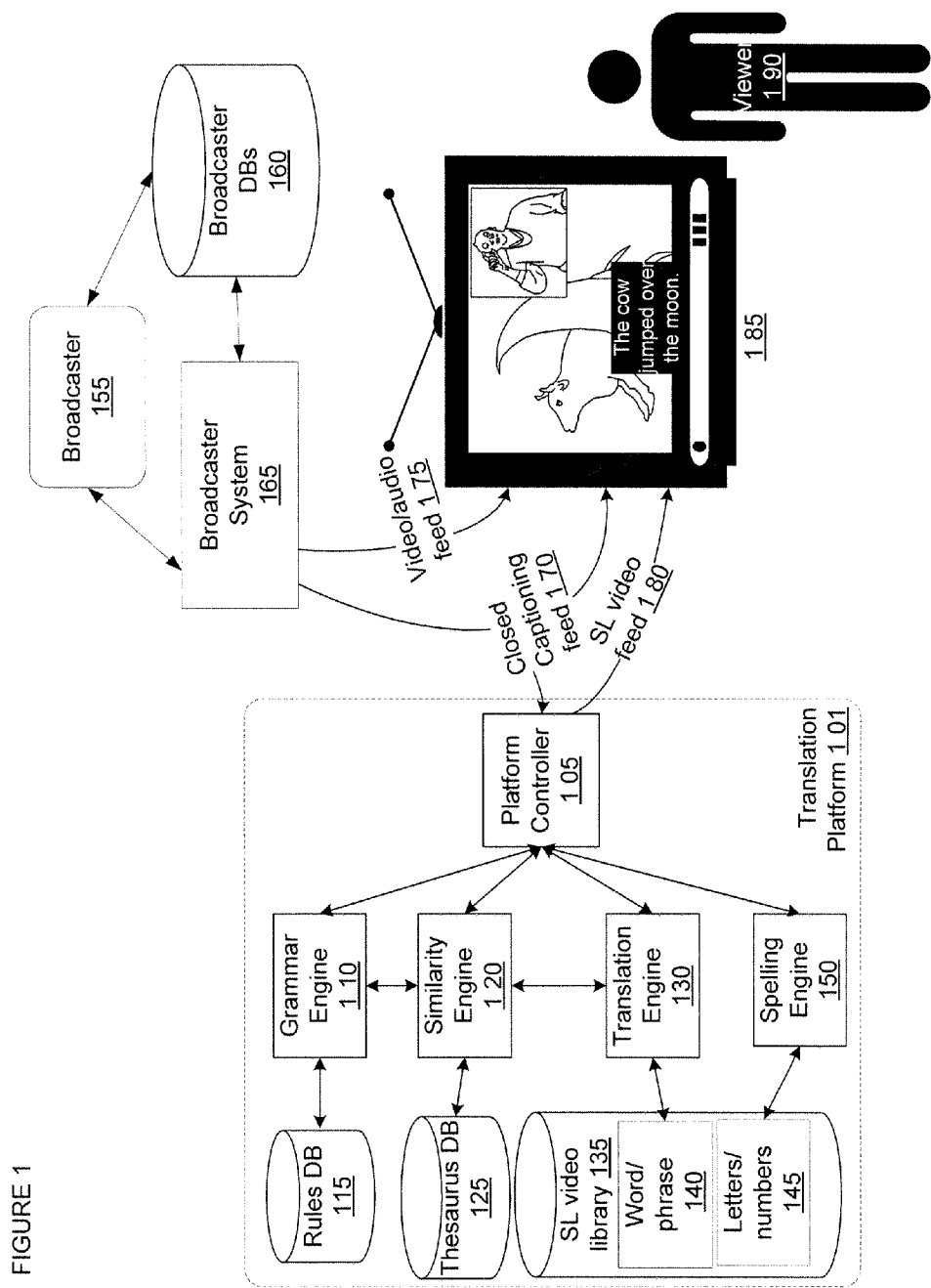
FIG. 1 provides an overview of translation platform components and entities that may interact with the translation platform at various points during system utilization in one embodiment.

FIG. 1 provides an overview of translation platform components and entities that may interact with the translation platform at various points during system utilization in one embodiment. The translation platform 101 may contain a number of functional modules and data libraries. A platform controller 105 may orchestrate the reception and distribution of data to and from the translation platform, as well as between various other translation platform modules. A grammar engine 110 may communicate with a rules database 115, containing a collection of language grammar rules, to process contextual aspects of written speech inputs. A similarity engine 120 may communicate with a thesaurus database 125, containing lists of speech elements with associated synonyms, to find synonyms for input speech elements. A translation engine 130 may communicate with a sign language (SL) video library 135, containing video clips of words/phrases 140 and letters/numbers 145, and/or the like in sign language format, to produce sign language video clips corresponding to speech element inputs.

Other elements of speech for which sign language signs exist may also be included in the SL video library, such as punctuation, grammatical and/or mathematical symbols, and/or the like. Video clips contained in the SL video library may be comprised of recordings of a real person, cartoon figures, computer-generated avatars, and/or the like performing sign language. A spelling engine 150 may process written speech inputs to discern constituent letters and communicate with the SL video library 135 to extract the corresponding sign language video clips.

The translation platform 101 may be in communicative contact with a broadcaster 155, with associated broadcaster database 160 and broadcaster system 165 and configured to receive a textual speech input, such as a Closed Captioning feed 170. The broadcaster may also supply the Closed Captioning feed 170 and associated video/audio feed 175 directly to a display device 185 for a viewer 190 to see. The translation platform 101 is also communicatively coupled to the display device 185 to supply a SL video feed 180.

In one embodiment, the platform controller 105 is housed separately from other modules within the translation platform, while in another embodiment, the other modules are housed within the platform controller module.

Process Flow Overview

Figure 2:
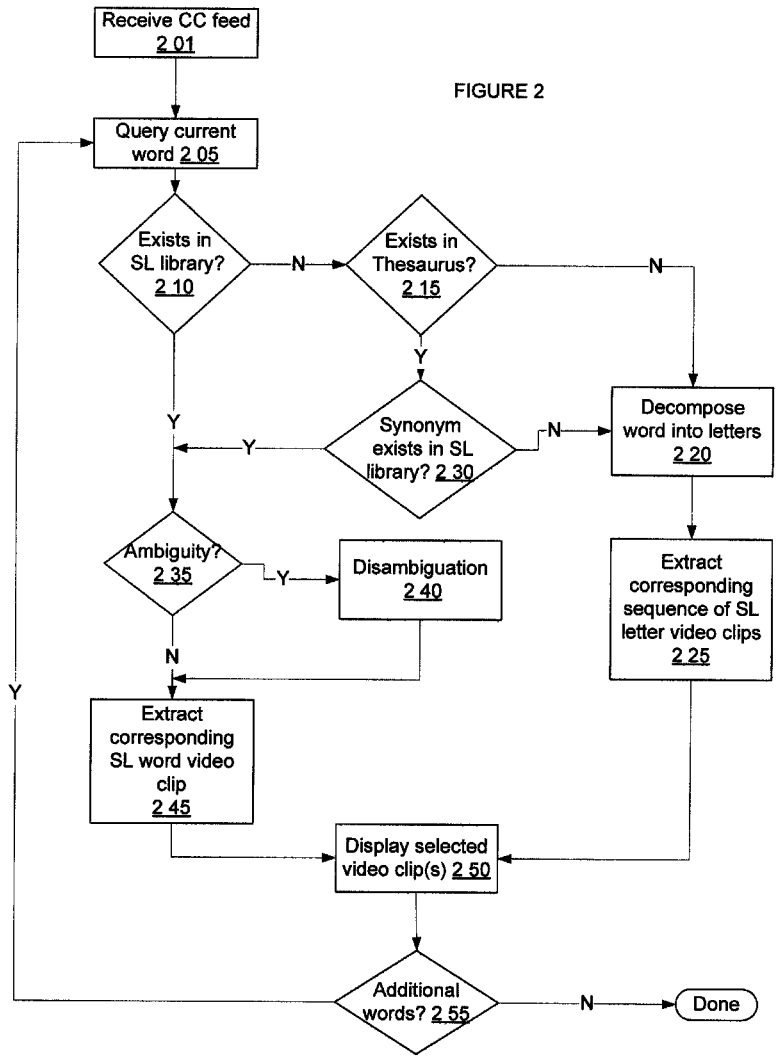
FIG. 2 shows logic flow for the translation platform in one embodiment.

FIG. 2 shows logic flow for the translation platform in one embodiment. The translation platform receives a Closed Captioning ("CC") feed at 201. The translation platform may be configured to receive and process a variety of textual elements as well as other forms of text-based speech such as subtitles, RSS feeds and other web feeds, news feeds, news tickers, stock tickers, and generally any text element that may exist in or be converted to digital format.

At 205, the translation platform conducts a query based on the current word, for example the first word in reading order of the Closed Captioning feed that has not yet been processed by the platform. More specifically, the system's current word query, checks the SL video library to see if a corresponding video element exists therein 210. If not, the current word query checks a thesaurus database to determine if a similar video element can be matched therein 215. If the thesaurus check does not result in a match, then the current word may be decomposed into constituent letters and/or numbers 220 and the SL video clips corresponding to these letters and/or numbers may be extracted and aggregated in a video clip from SL video database at 225.

Alternatively, if the current word thesaurus database check 215 returns a match, then each possible corresponding synonyms may be checked against the SL video library until a viable current word alternate is found in the SL video library 230. If none of the current word's synonyms exist in the SL video library, the platform proceeds to steps over to constituent letter processing 220. Otherwise, if the original current word or its synonyms exist in the SL video library, then the translation platform proceeds to 235, where a determination is made as to whether any additional ambiguity exists about which SL video clip to extract from the SL video library. Ambiguity may arise, for example, for homographs, that is words that have the same spelling but different meanings (for example, "bark" may refer to the skin of a tree or to the sound that a dog makes). If ambiguity exists, then a disambiguation procedure is undertaken at 240, which will be described in greater detail below, to winnow multiple possible results to a single SL video clip. At 245, the selected SL video clip corresponding to the current word or one of its synonyms is extracted from the SL video library. At 250, selected video clips are output to the display, and the platform checks at 255 whether there are further words to process. In some implementations, processing speed is prioritized over precision. Accordingly, in such implementations, the translation platform may sacrifice precision by omitting the ambiguity analysis.

Video Output

Figure 3A:
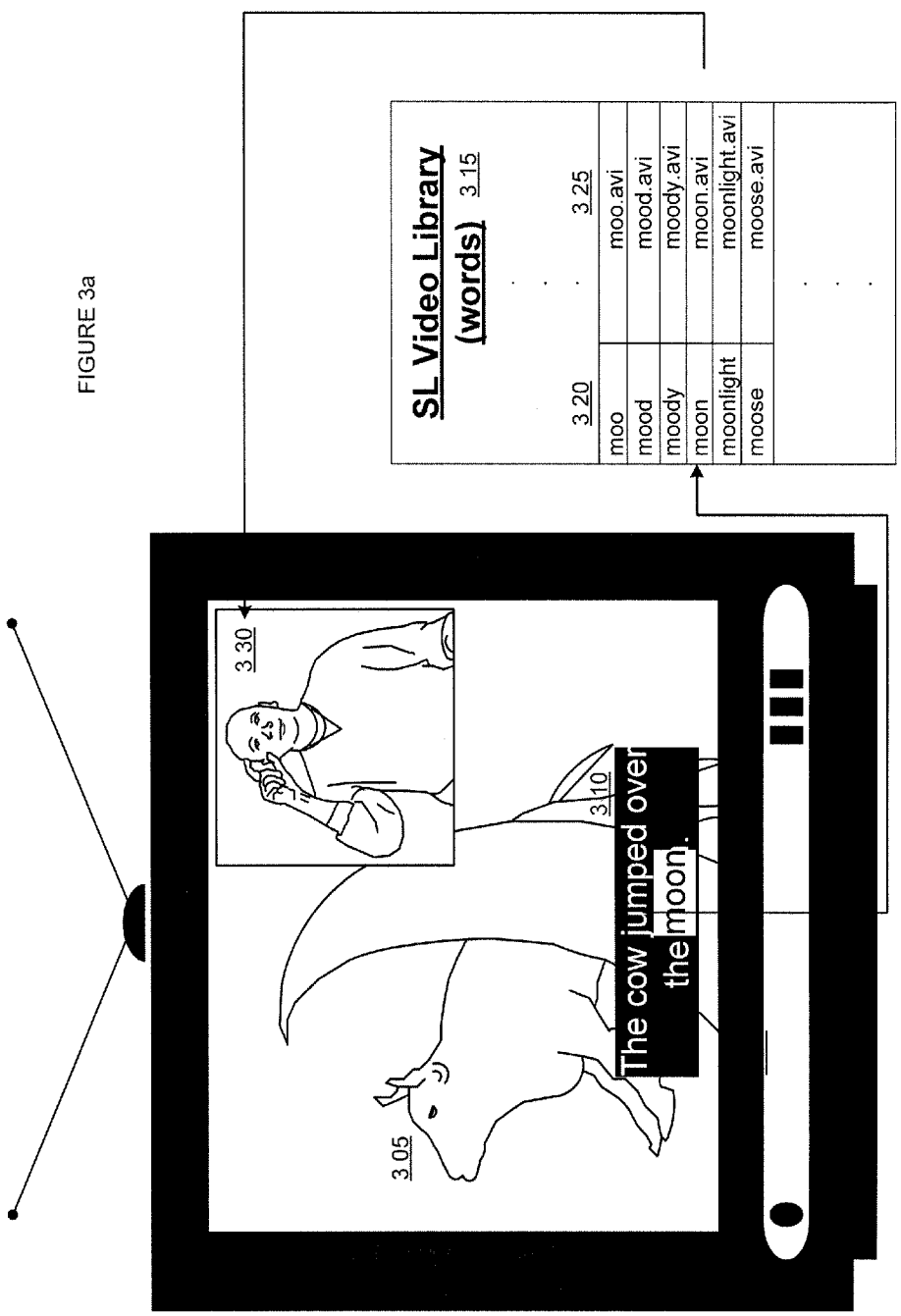
FIGS. 3a-d show output of SL video clips to the screen of a display device as a picture-in-picture style window in four embodiments.

In one embodiment, the translation platform may be configured to output SL video clips to the screen of a display device as a picture-in-picture style window. Examples of these types of implementations are shown in FIGS. 3a-d. In FIG. 3a, a television 301 displays video content 305 with corresponding Closed Captioning text 310. The highlighted word, "moon", is the current word under consideration by the translation platform. The SL video library 315 may be queried to find this word among a list of words 320 with corresponding SL video clip files 325. In the figure, the video clip format is designated as .avi, but any suitable video file format may be employed within different implementations of the present invention. Once the appropriate SL video clip has been selected, it is routed to the video input of the television 301 and displayed as a picture-in-picture window 330.

Figure 3B:
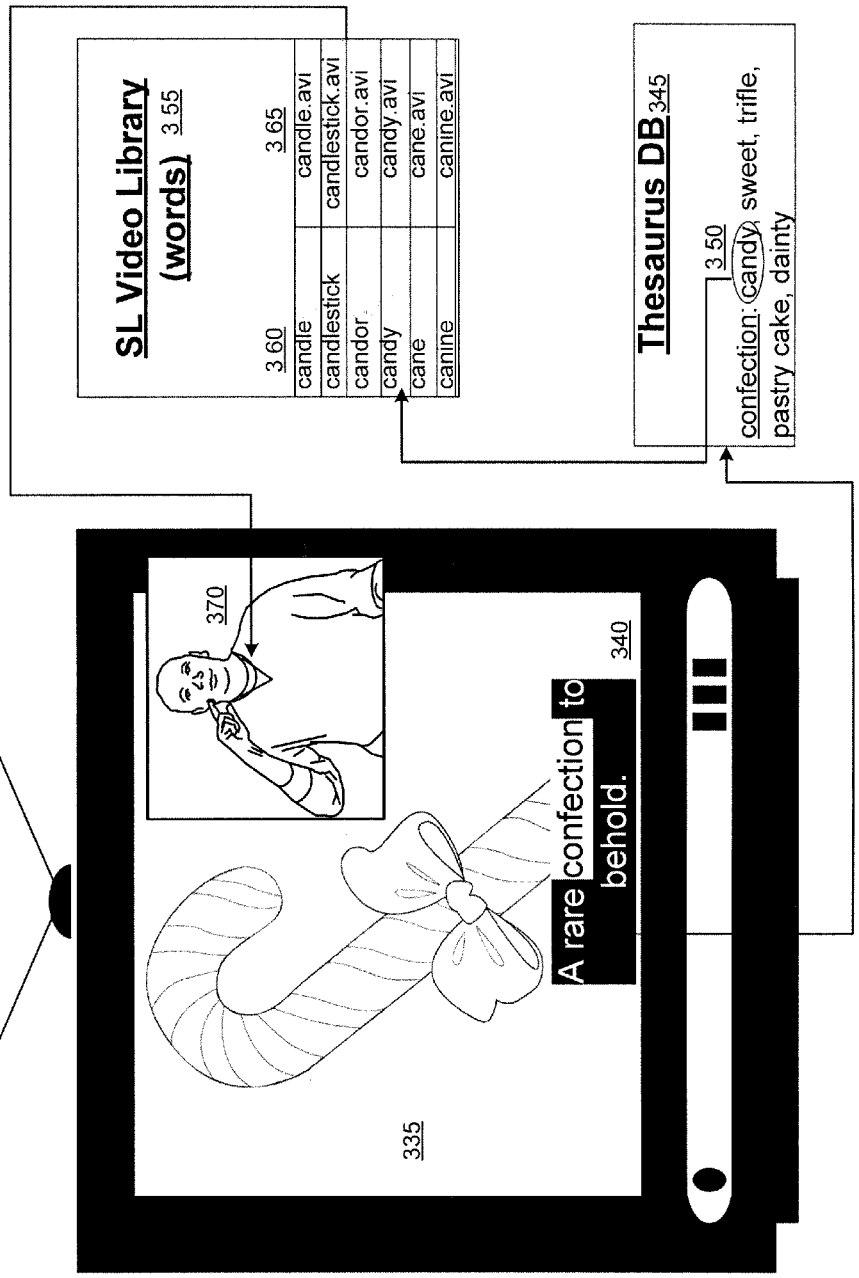

In FIG. 3b, illustrates aspects of the translation platform in a situation wherein the current word is not, itself, found in the SL video library. Here, an object in the video display 335 is described in the Closed Captioning 340 as a "confection". It is assumed in this illustrative example that the term "confection" does not exist in the SL video library. Consequently, the similarity engine (120 from FIG. 1) queries the thesaurus database 345 to identify synonyms for the word. In one embodiment, the translation platform checks each synonym for a given word for existence in the SL video library in the order in which they are listed in the thesaurus DB until one is found that exists in the SL video library. In the case shown in FIG. 3b, the first synonym for "confection" is "candy" 350, which has an SL video library 355 entry in the list of words 360 with corresponding video clips 365. Consequently, the video clip corresponding to "candy" is selected, retrieved (candy.avi) and output to the display screen within a picture-in-picture window 370.

Figure 3C:
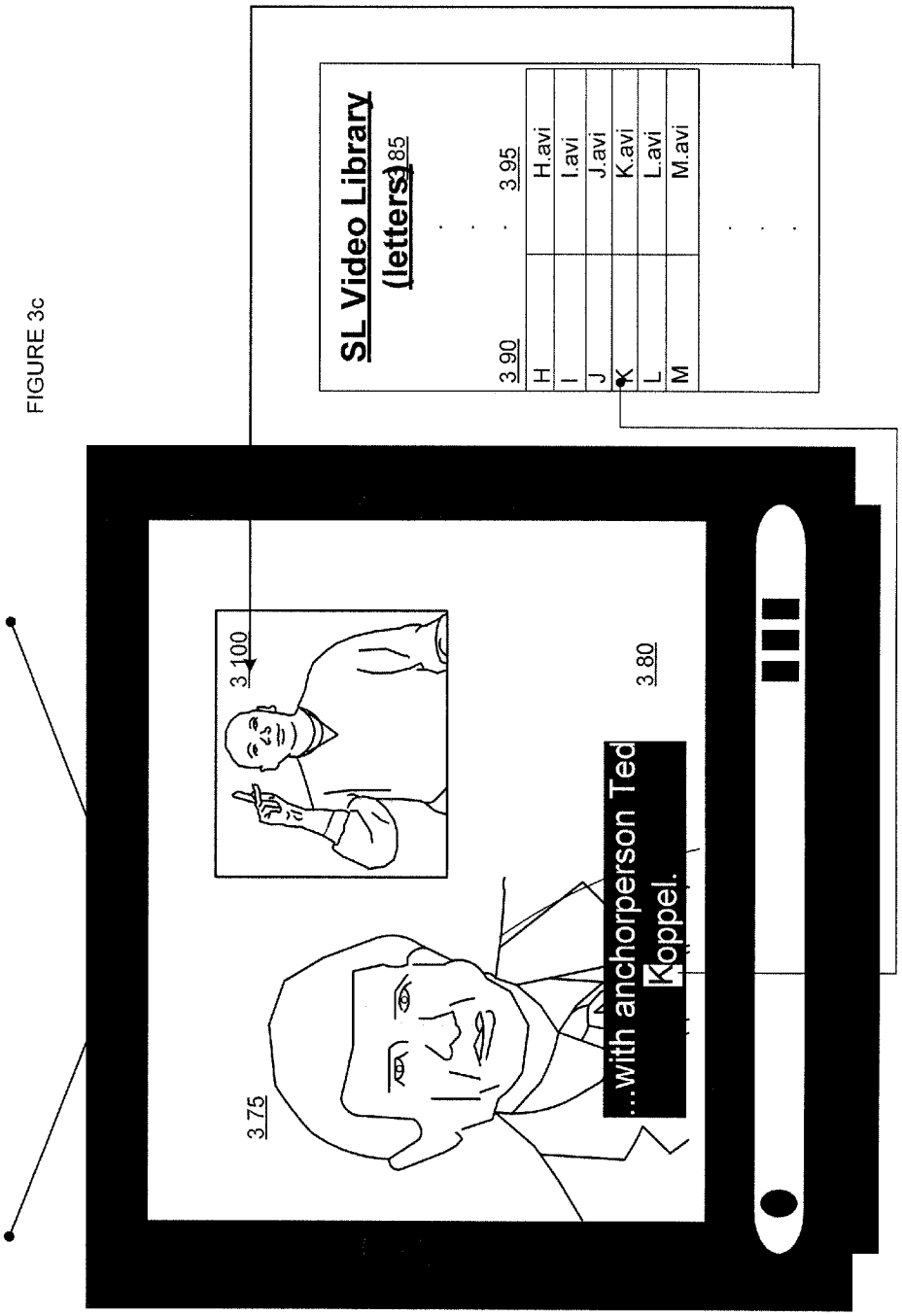

In FIG. 3c, illustrates aspects of the translation platform in a situation wherein the current word is not found in either the SL word video library or the thesaurus DB. In this case, the translation platform will decompose the word into its constituent letters and play videos corresponding to each letter in the word. This is similar to the sign language practice of fingerspelling for expressions that lack established signs. In the figure, the video display shows television anchorperson Ted Koppel 375, with corresponding description in the Closed Captioning 380. After checking the SL word video library, and the thesaurus DB, the translation platform breaks down the last name "Koppel" into its constituent sequence of letters (K-O-P-P-E-L) and queries the SL video library 385 for letter entries 390 with corresponding SL video clips 395.

The SL video clip corresponding to each letter in the sequence is extracted and routed in order to the display screen picture-in-picture window 3100.

In one implementation, the current word, phrase, letter, number, punctuation mark, and/or the like for which an SL video clip is being played in the picture-in-picture window is also highlighted in the Closed Captioning display. In another implementation, limited and/or selective highlighting of speech elements occurs. In yet another implementation, no highlighting occurs.

Dialogue and Tone of Voice

Figure 3D:
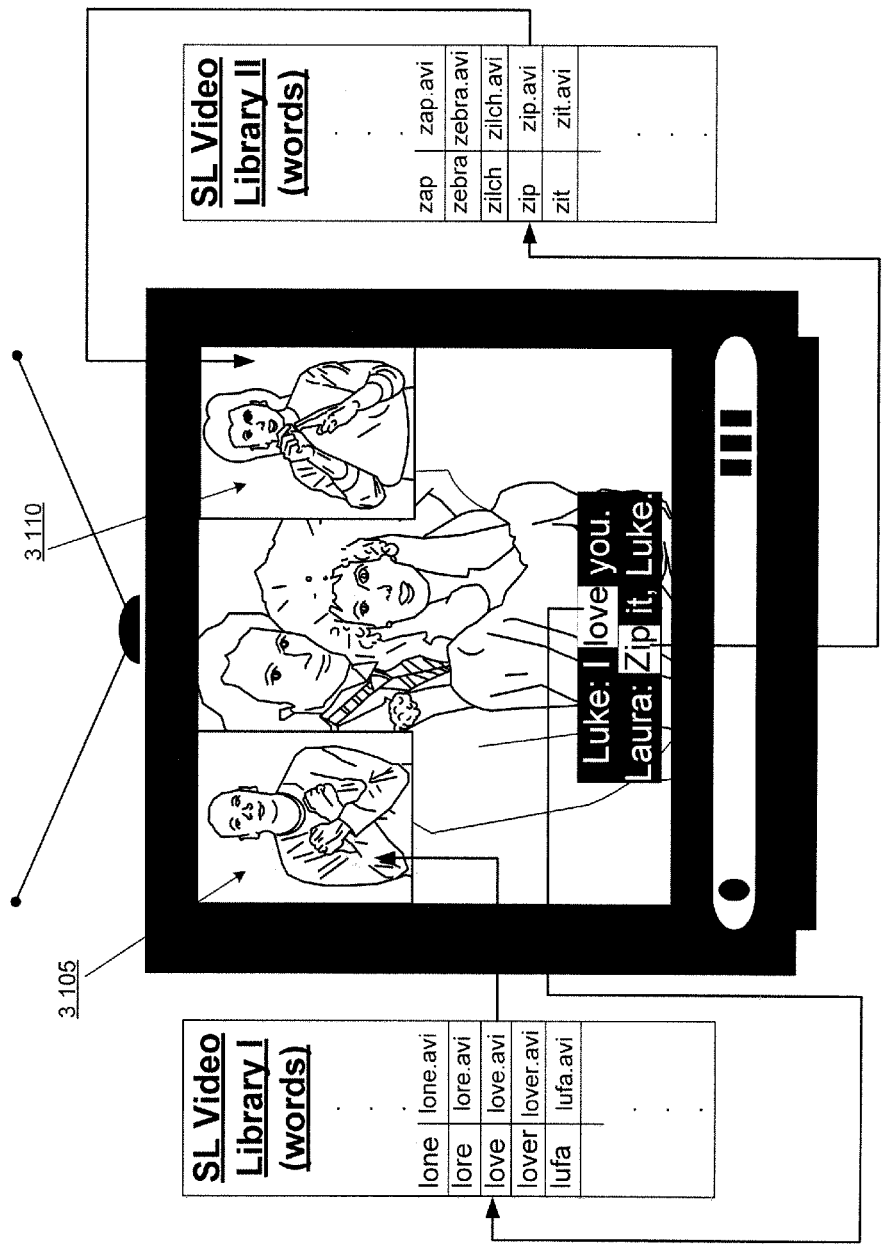

FIG. 3*d* illustrates aspects of the translation platform output configured to manage multiple written speech sources (e.g., different speakers) or tones of speech.

In one embodiment, the translation platform may detect multiple speakers in a Closed Captioning feed, such as by detecting colons, which are often used to separate the name of the speaker from the actual speech, and the names that precede them. When multiple speakers are detected, the translation platform may create additional picture-in-picture SL video clip display windows to correspond to each of the speakers (3105, 3110). In one implementation, the size of the SL video clip display windows are adjusted to accommodate the introduction of new windows.

In another embodiment, the characteristics of signing figures in the SL video clips may be chosen to based on the characteristics of speakers in the broadcaster feed to the extent that identification of speaker characteristics are possible. For example, the rules database may contain lists of male and female names, and the translation platform may be able to identify the gender of the speaker by matching the name before a detected colon to names in those lists. The translation platform may then selectively choose SL video clips with male or female signing figures depending on whether the speaker's gender is male or female respectively. This is illustrated in FIG. 3*d*, wherein the speech of the male and female speakers (Luke and Laura) are represented by male and female figures in SL windows 3105 and 3110 respectively. In one implementation, the different SL figures are stored in separate SL video libraries (I and II for male and female respectively in the figure).

In another embodiment, the translation platform may detect tone of voice and adjust SL video clip display window properties accordingly. Closed Captioning feeds often include qualifiers that specify the tone or volume of speech, for example by putting "(yelling)" or "(whispering)" before a sentence. The rules database may contain lists of common qualifiers which may be detected by the grammar engine. Detection of a qualifier may trigger an adjustment in the SL video clip display window properties. For example, a recognized qualifier may trigger the translation platform to modify the brightness, sharpness, or color balance for the SL video clips corresponding to the subsequent written speech to be changed (e.g., shifting to red for yelling, shifting to blue for whispering, etc). In another example, a recognized qualifier may trigger the translation platform to modify the size of the SL video clip display window (e.g., larger for yelling, smaller for whispering).

Real Time Processing

The translation platform may be configured to process written speech input, such as Closed Captioning feeds, in real time as they are received. This is facilitated in part by the use of the similarity engine and thesaurus database, which allow the SL video database to contain fewer entries than a more comprehensive SL video database that would be required in the absence of these elements. Despite this aspect, however, discrepancies between SL video clip timing (including processing time as well as the timing of the video clips themselves) and video/audio/Closed Captioning timing may lead to unacceptably large lags or advances between the broadcaster output and the translation platform output. This may be particularly true for fingerspelling of names or unrecognized speech elements. Consequently, the translation platform may be configured to detect and/or correct for such timing discrepancies.

In one embodiment, detection of timing discrepancies proceeds by counting the number of speech elements (e.g., words) between the current word being displayed in the SL video clip window and the first word displayed in the broadcaster's Closed Captioning display. In another embodiment, the translation platform may associate a timer with the broadcaster's Closed Captioning display and a second timer with the SL video clip display that is correlated with the first timer in such a way that the time on the second timer while showing an SL video clip corresponding to a particular speech element will equal the time on the first timer when that speech element was shown in the Closed Captioning display. In some embodiments, the system may be configured variety of system streamline thresholds based on a series of different timing discrepancy values. The translation platform may be configured to implement different timing discrepancy values for different types of media feed (e.g., different values may be implemented for a news video feed, as opposed to a the dialogue from a soap opera).

Correction of timing discrepancies may proceed in a number of different ways within various embodiments of the present invention. In one embodiment, the SL video clip window jumps discontinuously to the first word in the Closed Captioning display once the timing discrepancy exceeds a pre-designated threshold value. In another embodiment, the viewer may initiate the discontinuous jump, such as by pressing a remote control button. In another embodiment, the SL video clips are sped up or slowed down to reduce the degree of discrepancy. A playback speed function that is dependent on the timing discrepancy variable (e.g., the difference between the first timer and second timer within the time embodiment described above) may be pre-programmed into the translation platform. In another embodiment, the viewer may fast-forward, slow, stop, or rewind the SL video display window.

In another embodiment, certain words, when detected, are not converted to SL video clips to save time. For example, articles of speech such as "a", "an", "the", and/or the like may be neglected by the translation platform. In yet another implementation, a word-drop threshold may be implemented (e.g., every fifth word may be dropped from the conversion process). This may result in a reduced performance factor. However, it is noted that the effect will be significantly reduced the greater the distance between drops (e.g., dropping every eighth word has less of a performance impact than dropping every third word). Furthermore, in some implementations the system may implement this type of processing only when a timing discrepancy is identified. As such the system may process at a one to one element ratio, drop in to a six-word word-drop threshold and then step back into a one to one element ratio once the discrepancy has been corrected.

Moreover, it is to be understood that various combinations of these corrective measures may be implemented in a variety of combinations to optimize the discrepancy correction process and minimize the impact of translation platform performance.

Video Clip Continuity

Stringing together sequences of video clips can pose problems of continuity. This can be particularly troublesome for SL video clips, as jerky movements at the interstices between clips can lead to viewing difficulty, mistranslation, and/or the like. The translation platform may be configured to reduce and/or eliminate such problematic discontinuity issues. FIG. 4 shows a solution to the problem of video clip discontinuity in one embodiment of the translation platform, wherein the signing figure adopts the same neutral element (e.g., the figure's hand) position at the beginning and end of every SL video clip. In the example of FIG. 4, the video clip begins at 401 with a first frame in which the signing figure holds hands together in front, followed at 405 by the SL video clip content itself (in this case, the sign for "moon"), and concluding at 410 with a closing frame in which the signing figure assumes the same pose or gesture as at 401. This technique, together with other measures such as consistent framing of the signing figure, clothing, facial expression, and/or the like, may help to ensure minimal discontinuity between SL video clips.

In another embodiment, morphing software such as xmorph may be employed to continuously connect the closing frame of one live SL video clip with the opening frame of the next SL video clip in the sequence.

Grammar Engine

A grammar engine (110 from FIG. 1) and associated rules database (115 from FIG. 1) may be employed for implementing rules and/or trends of speech. The grammar engine and rules database may facilitate a number of different functions and/or in various combinations within embodiments of the translation platform.

In one embodiment, the grammar engine and/or rules database may delineate a word hierarchy, quantifying commonality of word occurrences. For example, the 500 most commonly occurring words may be specially designated within the grammar engine and/or rules database for quick and easy identification and access within the translation platform.

In another embodiment, the grammar engine and/or rules database may specify rankings for synonyms within the thesaurus database. Selection of synonyms from the thesaurus database may, then, be weighted based on these rankings.

In another embodiment, the grammar engine and/or rules database may facilitate disambiguation of multiple translation possibilities. This may be accomplished, for example, by populating the rules database with selection rules for commonly confused words. For example, if the current word under consideration by the translation platform is "bark", it may be initially unclear whether the term refers to the skin of a tree or to the sound that a dog makes. The rules database may contain en entry for "bark" that, for example, specifies that the grammar engine is to search nearby words in the Closed Captioning feed for "dog" or "tree", and to assign the proper definition to the word based on which of the two is found. If neither is found, the rule may specify that the more common usage is to be applied. The grammar engine may also perform other context processing functions, such as checking words near the current word in order to determine the current word's lexical category, linguistic category, part of speech, etc.

In another embodiment, the rules database may contain records of common phrases, expressions, and/or other common combinations of words. When an SL word DB element or ambiguous current word is encountered, the word may be checked, together with surrounding words in the Closed Captioning feed, against such records to determine whether it is part of a common phrase. If so, this allows for a quick determination of video elements that will follow the word element or deciphering the intended meaning of the ambiguous term. In one implementation, a match in the Closed Caption feed to a word record that is identified as an introductory word of a common phrase may automatically trigger the playback the full sequence of SL video clips corresponding to the words in that phrase.

In another embodiment, the translation engine may be configured to discern capitalization of input written speech. This may be useful, for example, in distinguishing proper names from common words. For example, "Rob" may mean "to steal" or may be a diminutive form of the name "Robert". If an unusual capitalization of this or similar speech element is detected, such as a capitalization in the middle of a sentence, then the translation engine may discern that the speech element refers to a proper name rather than a common word. Characteristics of unusual capitalizations may be delineated within the rules database. In one embodiment, all written speech elements corresponding to proper names are expressed by the translation platform via fingerspelling.

Text-to-Sign Language Translation Platform Controller

Figure 5:
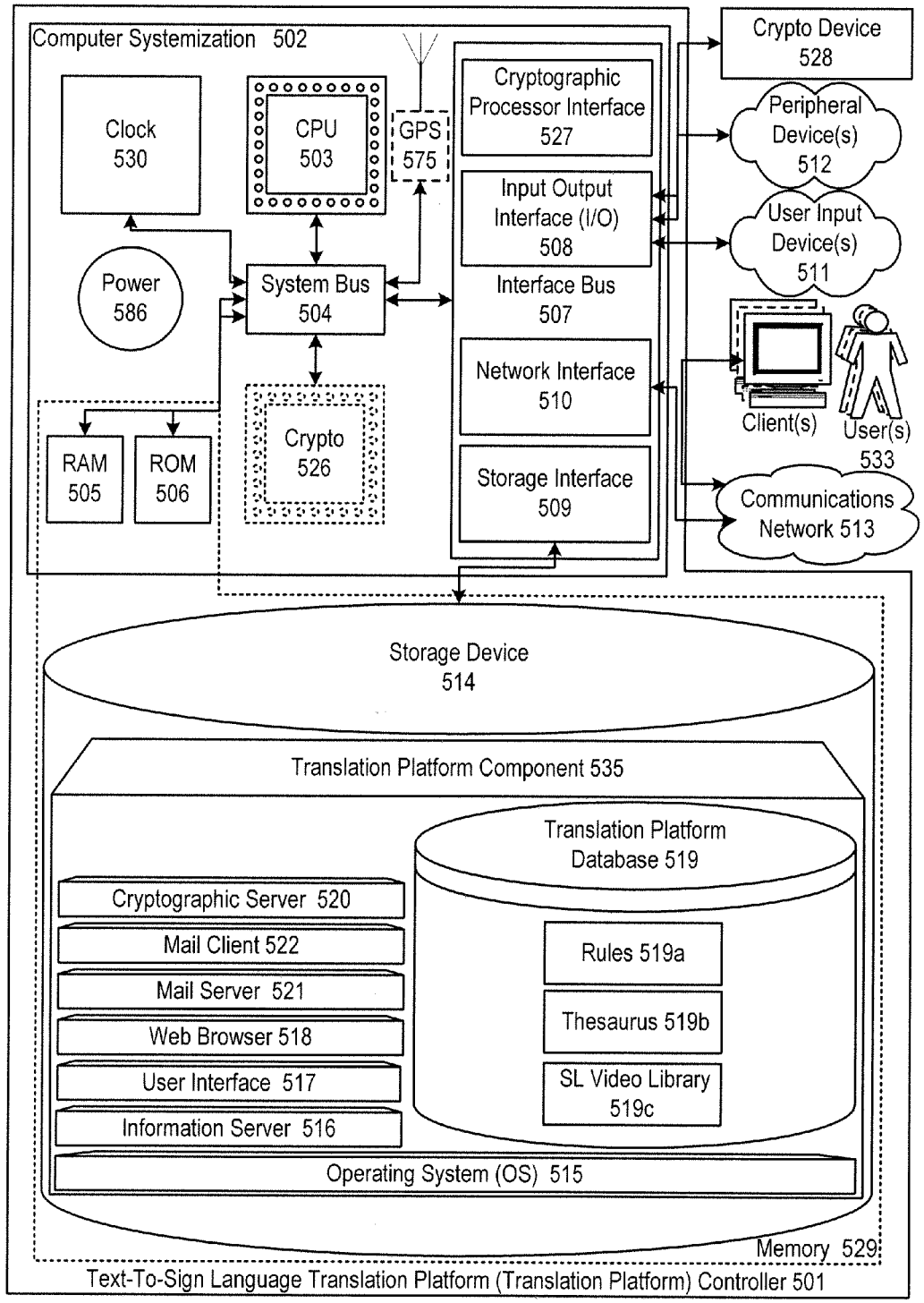
FIG. 5 is a block diagram illustrating embodiments of the present invention of a Text-to-sign language translation platform controller.

FIG. 5 of the present disclosure illustrates inventive aspects of a text-to-sign language translation platform controller 501 in a block diagram. In this embodiment, the text-to-sign language translation platform controller 501 may serve to aggregate, process, store, search, serve, identify, instruct, generate, match, and/or update databases, database elements, database element fields, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the text-to-sign language translation platform controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The text-to-sign language translation platform controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, the computer systemization may be connected to an internal power source 586. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the text-to-sign language translation platform controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the text-to-sign language translation platform thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 113, the text-to-sign language translation platform controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the text-to-sign language translation platform controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the text-to-sign language translation platform controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the text-to-sign language translation platform controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the text-to-sign language translation platform component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices. RAM, remote storage facilities through a communications network, ROM, various forms of memory, and/or the like.

Operating System

The operating system component 515 is an executable program component facilitating the operation of the text-to-sign language translation platform controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the text-to-sign language translation platform controller to communicate with other entities through a communications network 513. Various communication protocols may be used by the text-to-sign language translation platform controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective–) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the text-to-sign language translation platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the text-to-sign language translation platform database 519, operating systems, other program components, user interfaces, Web browsers, and/or the like.

Access to the text-to-sign language translation platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Text-to-sign language translation platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the text-to-sign language translation platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 517 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the text-to-sign language translation platform enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the. The mail server may allow for the execution of program components through facilities such as ASP, ActiveX, (ANSI) (Objective−) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the text-to-sign language translation platform.

Access to the text-to-sign language translation platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the text-to-sign language translation platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the text-to-sign language translation platform component to engage in secure transactions if so desired. The cryptographic component facilitates the secure accessing of resources on the text-to-sign language translation platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Text-to-Sign Language Translation Platform Database

The text-to-sign language Translation Platform database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the text-to-sign language translation platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the text-to-sign language translation platform database is implemented as a data-structure, the use of the text-to-sign language translation platform database 519 may be integrated into another component such as the text-to-sign language translation platform component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519*a-c*. A Rules table 519*a* includes fields such as, but not limited to: word hierarchies, phrase hierarchies, synonym rankings, name lists, speech qualifiers, SL video clip output rules, and/or the like. A Thesaurus table 519*b* includes fields such as, but not limited to: input word, synonyms, antonyms, homographs, and/or the like. A SL Video Clip table 519*c* includes fields such as, but not limited to: input word, video clip file and/or file location, and/or the like. These and/or other tables may support and/or track multiple entity accounts on the Platform.

In one embodiment, the text-to-sign language translation platform database may interact with other database systems. For example, employing a distributed database system, queries and data access by Translation Platform modules may treat the combination of the text-to-sign language translation platform database and another database as a single database entity.

In one embodiment, user programs may contain various user interface primitives, which may serve to update the text-to-sign language translation platform. Also, various accounts may require custom database tables depending upon the environments and the types of clients the text-to-sign language translation platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-c*. The text-to-sign language translation platform may be configured to keep track of various settings, inputs, and parameters via database controllers.

The text-to-sign language translation platform database may communicate to and/or with other components in a component collection, including itself, and/or facilities of the like. Most frequently, the text-to-sign language translation platform database communicates with the text-to-sign language translation platform component, other program components, and/or the like. The database may contain, retain, and provide information regarding other nodes and data.

The Text-to-Sign Language Translation Platform

The text-to-sign language translation platform component 535 is a stored program component that is executed by a CPU. The text-to-sign language translation platform affects accessing, obtaining and the provision of information, services, transactions, and/or the like across various communications networks.

The text-to-sign language translation platform component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the text-to-sign language translation platform server employs a cryptographic server to encrypt and decrypt communications. The text-to-sign language translation platform component may communicate to and/or with other components in a component collection, including itself, and/or facilities of the like. Most frequently, the text-to-sign language translation platform component communicates with the text-to-sign language translation platform database, operating systems, other program components, and/or the like. The text-to-sign language translation platform may contain, communicate, generate, obtain, and/or provide program component, system, user, and/or data communications, requests, and/or responses.

Distributed Text-to-Sign Language Translation Platform

The structure and/or operation of any of the text-to-sign language Translation Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the text-to-sign language translation platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, remote, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for translating information, comprising:
receiving a textual speech input element;
translating the textual speech input element using predefined selection modification criteria;
querying a moving image database for a moving image corresponding the translated textual speech input element;
selecting from the moving image database at least one sign language target image clip based on the translating of the textual speech input element, the at least one sign language target image clip exhibiting continuity promoting images including a figure with hands in a neutral position in opening and closing frames of the sign language target mage clip; and
outputting the at least one sign language target image clip to a display device.

2. The method of claim 1, wherein the translating the textual speech input element using predefined selection modification criteria comprises one or more of:
querying the moving image database for synonymous word correlation of the textual speech input element and the moving image in the moving image database;
querying a thesaurus database for corresponding synonyms of the textual input element using a thesaurus;
querying a grammar engine for improving contextual translation of the textual speech input element;
determining whether a word-drop threshold has been reached;
identifying a gender of a person associated with the textual speech element;
detecting a tone of a person associated with the textual speech input element; and
combinations thereof.

3. The method of claim 2, wherein the identifying the gender of the person associated with the textual speech element results in an outputting the at least one sign language target image clip to a display device of a person of that same gender.

4. The method of claim 2, wherein the detecting the tone of the person associated with the textual speech input element results in an outputting the at least one sign language target image clip to a display device of a predefined color corresponding to a predefined tone.

5. The method of claim 2, wherein if the querying the moving image database for synonymous word correlation of the textual speech input element and the moving image in the moving image database is unsuccessful, the method further comprises retrieving a series of constituent letter and alpha-numeric video elements and aggregating the constituent letter and alpha-numeric video elements as a corresponding moving image element for display; and outputting the corresponding moving image element for display on the display device.

6. The method of claim 1, wherein the moving image database is selected from a database having: video recordings of a real person, cartoon figures, computer-generated avatars, and combinations thereof.

7. The method of claim 1, wherein the textual speech input element is derived from a Closed Captioning feed.

8. The method of claim 1, further comprising:
determining whether a timing discrepancy between the textual speech input element and the sign language target image clip exists; and
implementing a timing discrepancy corrective process.

9. The method of claim 8, further comprising:
transitioning back to non-corrective processing, when the timing discrepancy has been corrected.

10. The system of claim 1, further comprising continuously connecting the images in the opening and closing frames via a morphing system to promote the continuity of the images in the opening and closing frames.

11. A processor-implemented method for translating information, comprising:
- receiving a textual speech input element;
- translating the textual speech input element using predefined selection modification criteria, the selection modification criteria including implementing a word-drop threshold when a timing discrepancy is identified, determining whether the word-drop threshold is reached, and dropping at least one word from the translating of the textual speech input element when the word-drop threshold is reached;
- querying a moving image database for a moving image corresponding the translated textual speech input element;
- selecting from the moving image database at least one sign language target image clip based on the translating of the textual speech input element; and
- outputting the at least one sign language target image clip to a display device.

12. The method of claim 11, wherein the selection modification criteria includes identifying a gender of a person associated with the textual speech element.

13. The method of claim 11, wherein the selection modification criteria includes detecting a tone of a person associated with the textual speech input element.

14. The method of claim 11, wherein the dropping at least one word from the translating of the textual speech input element includes dropping one of every third word, every fifth word, every sixth word, and every eighth word from the translating of the textual speech input element.

\* \* \* \* \*